United States Patent [19]

Ascough et al.

[11] Patent Number: 4,976,862

[45] Date of Patent: Dec. 11, 1990

[54] PROCESS FOR EXTRACTION AND RECOVERY OF BLOWING AGENTS FROM POLYMERIC FOAMS

[75] Inventors: Michael R. Ascough, Oakville; James A. Bueley, Iroquois, both of Canada

[73] Assignee: Dupont Canada Inc., Mississauga, Canada

[21] Appl. No.: 335,947

[22] Filed: Apr. 10, 1989

[51] Int. Cl.$^5$ .............................................. B01D 53/04
[52] U.S. Cl. ...................................... 210/656; 55/16; 55/37; 210/804
[58] Field of Search ................. 264/37; 55/23, 16, 74, 55/179; 210/656, 804

[56] References Cited

U.S. PATENT DOCUMENTS

| | | | |
|---|---|---|---|
| 3,780,744 | 12/1973 | Neel et al. | 131/134 |
| 3,788,331 | 1/1974 | Neel et al. | 131/143 |
| 3,793,801 | 2/1974 | Tsao | 55/71 |
| 4,095,605 | 6/1978 | Conrad | 131/134 |
| 4,098,996 | 7/1978 | Ryan et al. | 264/37 X |
| 4,175,932 | 11/1979 | Durr et al. | 55/59 |
| 4,289,605 | 9/1981 | Bartholic | 208/113 |
| 4,531,950 | 7/1985 | Burt | 55/23 |
| 4,531,951 | 7/1985 | Burt | 55/23 |

*Primary Examiner*—Frank Spear

[57] ABSTRACT

A process for removing blowing agent from polymeric foam. The process comprises breaking up the foam in a liquid medium to obtain a solid phase of polymeric fragments and a liquid phase of blowing agent and liquid medium. The polymeric particles are then separated from said liquid phase.

32 Claims, No Drawings

PROCESS FOR EXTRACTION AND RECOVERY OF BLOWING AGENTS FROM POLYMERIC FOAMS

BACKGROUND OF THE INVENTION

This invention relates to the extraction and recovery of blowing agents from polymeric foams.

It is desirable to extract and recover blowing agents from polymeric foams to determine the amount of blowing agent that was present in the foam, reclaim the blowing agent and/or reclaim the polymer. It is especially important to recover blowing agents from scrap foams since emissions of blowing agents to the atmosphere may cause damage to the environment. Also, reuse of the blowing agents enhances the economics of the foam manufacturing process.

Processes have been developed to recover and reclaim blowing agents from thermoplastic and thermoset foams during their manufacture to reduce loss of blowing agent. In these processes, air is passed over foam manufacturing lines and scrap foam recovery units to sweep away any excess blowing agents. The resultant air/blowing agent mixture is then separated.

U.S. Pat. No. 4,531,951 (Cellu Products Company) discloses a blowing agent recovery unit for recovering blowing agent from foam during production. This unit comprises an enclosed area surrounding the exit of the foam extruder. A fan or a blower sucks the stream of blowing agent in air out of the enclosed area and sends it to an activated carbon adsorption unit. A blowing agent-rich stream is sent from the carbon adsorption to a condenser. Water is condensed out of the stream at the condenser. The blowing agent-rich stream is then sent to a compressor. This stream is then compressed and the blowing agent is thereby liquefied. The blowing agent is then passed through a pressurized vessel and the blowing agent settles to the bottom of this vessel and is removed via a valve at the bottom of the vessel.

U.S. Pat. No. 4,531,950 (Cellu Products Company) discloses a similar blowing agent recovery unit to the unit disclosed in the above-mentioned patent which also includes a scrap foam recovery unit. This unit grinds foam into small particles and pneumatically conveys the resultant particles and air fluorocarbon mixture to a cyclone separator. Some of the air-fluorocarbon mixture obtained is then recycled for pneumatic conveying and some of it is sent to the main blowing agent recovery unit for separation of the air and the blowing agent.

SUMMARY OF THE INVENTION

A method of extracting blowing agents from foams which recovers substantially more blowing agent and/or which recovers the blowing agent more efficiently than conventional methods is desired.

Accordingly, the invention provides a process for removing blowing agent from polymeric foam. The process comprises breaking up the foam in a liquid medium to obtain a solid phase of polymeric fragments and a liquid phase comprising blowing agent and liquid medium. The solid phase is then separated from the liquid phase.

The present invention requires fewer steps than conventional processes and so is more efficient. Also, since the blowing agent is captured by the liquid medium, the present invention may provide a greater amount of recovery of blowing agent than conventional methods.

DESCRIPTION OF THE PREFERRED EMBODIMENTS

The liquid medium may be completely immiscible, partly miscible or completely miscible with the blowing agent.

If the liquid medium is completely immiscible with the blowing agent, it is most preferred that the liquid medium be of a lower density than the blowing agent. The liquid medium will therefore float above and exert hydrostatic pressure on the blowing agent which will help to keep the blowing agent in a liquid as opposed to a gaseous form. The liquid medium and blowing agent may then be separated by decanting.

If the liquid medium is partly or completely miscible with the blowing agent, it is preferred, but not generally necessary that the liquid medium be of a higher density than the blowing agent. If the liquid medium and the blowing agent are not the same liquid and are partially or completely miscible, they may be separated by distillation. The liquid medium could be the same liquid as the blowing agent, in which case, no separation is necessary and the combined blowing agent and liquid medium may be used in the process of manufacturing foam.

If the liquids need to be separated by distillation, there must be a substantial boiling point differential between the two liquids. Preferably, the difference in boiling point is at least plus or minus at least 5° C. and most preferably plus or minus at least 10° C.

The liquid medium is preferably non-reactive with the foam and the blowing agent. However, the liquid medium may partially dissolve the foam to provide a colloidal suspension of foam in the liquid phase and still provide the advantageous results. The colloidal suspension of partially dissolved foam would be separated by centrifuging and/or decanting and/or filtration.

The medium is preferably selected from: halogenated hydrocarbons such as 1,1,2 trifluoro 1,2,2 trichloro ethane (CFC-113), monofluoro trichloro methane (CFC-11), 1,1,1trifluoro 2,2 dichloro ethane (HCFC-123), and dichloro methane (methylene chloride), hydrocarbons such as cyclohexane, hexane and toluene; alcohols such as isopropanol and ethanol; di and polyhydric alcohols such as ethylene glycol and polyethylene glycols; ketones such as acetone; esters such as ethyl acetate, DBE (dibasic ester: mixture of succinic, glutaric and adipic methyl esters), and dioctyl phthalate; ethers such as ethylene glycol mono methyl ether; amides such as dimethylformamide; acids such as propionic acid; aldehydes such as isobutyraldehyde; and water. Mixtures of the above may also be used for certain applications.

HCFC 123, 1 monofluoro 1,1 dichloroethane (HCFC 141b) and CFC 11 may be extracted by CFC11, HCFC 123, HCFC 141b, methylene chloride, DBE, dioctyl phthalate and water. CFC 113 may be extracted by CFC 113, CFC 11, HCFC 123, HCFC 141b, BE, dioctyl phthalate and water. Hydrocarbons such as butane, pentane and hexane may be extracted by cyclohexane, hexane, CFC 11, CFC 113, HCFC 123, HCFC 141b, dioctyl phthalate and DBE. CFC 114 (1,1,2,2 tetrafluoro 1,2 dichloroethane) may be extracted by CFC 113, HCFC 123, HCFC 141b, methylene chloride, DBE and dioctyl phthalate.

The formation of an azeotrope between the solvent and the blowing agent should be avoided unless the azeotrope can be split or used in the process in that form e.g. CFC 113 forms an azeotrope with methylene chloride and would not be suitable for the manufacture of closed cell phenolic foam therefore this solvent would not be used to extract the CFC 113/CFC 11 blended blowing agent.

Mixtures of blowing agents may also be extracted from foam by the process of the present invention. This may be done by either extracting the mixture in a medium of the same composition as one of the agents (if the other agent is extractable in this medium) or by extracting the mixture in a medium in which both agents are extractable. For example a mixture of CFC-113 and CFC-11 may be extracted by CFC-11 and a mixture of CFC-113 and a hydrocarbon may be extracted by CFC-11.

In a preferred embodiment of the process, the foam is submersed in the liquid medium and the cells of the foam are opened up by either cutting, crushing or pulverising the foam. This may be done by high speed rotating blades or nip rollers. The solids are then separated from the liquid mixture by centrifuging, filtering and/or decanting. Any blowing agent still present in the solid phase after separation may be recovered by passing air or inert gas such as nitrogen over the solid phase and removing the blowing agent from the gas by carbon adsorption on activated carbon beds. The blowing agent may be reclaimed from the beds by desorption with steam or hot nitrogen or by other known methods. Any blowing agent still present in the solid phase after separation may be removed by passing air or other inert gas ($N_2$) over the solid phase and removing the gas using membrane selective techniques. In both instances the recovered blowing agent would be returned to the foam process. A membrane selective technique is disclosed in U.S. Pat. No. 4,553,983 issued Nov. 19, 1985.

If it is desired to determine the amount of blowing agent in the foam, the liquid phase may be analysed by gas chromatography, liquid/liquid chromatography or any other suitable analytical technique after the solids have been separated.

The liquid medium and the blowing agent in the liquid mixture may then be separated by decanting if the liquid medium and blowing agent are immiscible, or by distillation if the liquid medium and blowing agent are miscible, to reclaim the blowing agent.

The invention will be further described, by way of illustration only, in the following examples.

EXAMPLE 1

Commercial closed cell rigid polyurethane foam containing 10 wt % plus or minus 2 wt % CFC-11 was pulverized in CFC-113 using a Waring blender. The pulverized foam and the liquid were separated by filtration. Four samples of the liquid were analyzed by gas chromatography. An average of these analyses indicated that about 2.5 wt % of the CFC-11 was extracted.

EXAMPLE 2

Commercial closed cell rigid phenolic foam containing 10 wt % plus or minus 2 wt % CFC-113 was pulverized in CFC-11 using a Waring blender. The pulverized foam and the liquid were separated by filtration. Two samples of the liquid were analyzed by gas chromatography. An average of these analyses indicated that about 2.2 wt % of the CFC-113 was extracted.

EXAMPLE 3

A first sample of a commercial closed cell rigid phenolic foam containing 10 wt % plus or minus 2 wt % of a blend of CFC-113 and CFC-11 was pulverized in CFC-11 using a Waring blender. The pulverized foam and the liquid were separated by filtration. Two samples of the liquid were analyzed by gas chromatography. An average of these analyses indicated that about 6.4 wt % of the CFC-113 was extracted by the CFC-11.

A second sample of a commercial closed cell rigid phenolic foam containing 10 wt % plus or minus 2 wt % of a blend of CFC-113 and CFC-11 was pulverized in CFC-113 using a Waring blender. The pulverized foam and the liquid were separated by filtration. Two samples of the liquid were analyzed by gas chromatography. An average of these analyses indicated that about 2.7 wt % of the CFC-11 was extracted by the CFC-113.

EXAMPLE 4

A 3.8 gms sample of a commercial polyurethane was pulverized in a gas tight Waring blender for 30 seconds in the presence of 200 mls of CFC 113. The solids where allowed to settle on the top of the CFC 113 after which the liquid layer was analyzed by G.C. for the concentration of CFC 11, the blowing agent. About 8.36% by weight of CFC 11 was found to have been extracted.

We claim:

1. A process for removing blowing agent from polymeric foam, said process comprising: breaking up said foam in a liquid medium to obtain a solid phase of polymeric fragments and a liquid phase of blowing agent, and liquid medium; and separating said polymeric fragments from said liquid phase.

2. The process of claim 1 wherein said liquid medium has a lower density than said blowing agent.

3. The process of claim 2 wherein said liquid medium is immiscible with said blowing agent.

4. The process of claim 2 wherein said process further comprises the step of separating said blowing agent from said liquid medium in the liquid phase by decanting.

5. The process of claim 1 wherein said liquid medium and said blowing agent are at least partially miscible.

6. The process of claim 5 further comprising the step of separating the blowing agent and said liquid medium in said liquid phase by distillation.

7. The process of claim 1 further comprising the step of analysing said liquid phase to determine the amount of blowing agent in said mixture.

8. The process of claim 7 wherein said liquid phase is analyzed by either gas chromatography or liquid/liquid chromatography.

9. The process of claim 1 further comprising the step of recovering any blowing agent still present in the solid phase after filtration by passing air or inert gas over the the solid phase.

10. The process of claim 9 further comprising passing the air or inert gas over a carbon bed and reclaiming the recovered blowing agent in said carbon bed by desorption of the carbon bed by steam or hot nitrogen.

11. The process of claim 6 wherein the difference between the boiling point of the liquid medium and the boiling point of said blowing agent is at least plus or minus 5° C.

12. The process of claim 11 wherein the difference between the boiling point of the liquid medium and the boiling point of said blowing agent is at least plus or minus 10° C.

13. The process of claim 5 wherein the liquid medium is of the same composition as the blowing agent.

14. The process of claim 1 wherein the liquid medium is selected from the group consisting of hydrocarbons, halogenated hydrocarbons, alcohols, dihydric alcohols, polyhydric alcohols, ketones, esters, ethers, amides, acids, aldhydes, water, and mixtures thereof.

15. The process of claim 14 wherein said halogenated hydrocarbons are selected from the group consisting of CFC-113, CFC-11, HCFC-123 and methylene chloride.

16. The process of claim 14 wherein said hydrocarbons are selected from the group consisting of cyclohexane, hexane and toluene.

17. The process of claim 14 wherein said alcohols are selected from the group consisting of isopropanol and ethanol.

18. The process of claim 14 wherein said dihydric alcohols are selected from ethylene glycol and polyethylene glycols.

19. The process of claim 14 wherein said ketones comprise acetone.

20. The process of claim 14 wherein said esters are selected from the group consisting of ethyl acetate, DBE (dibasic ester, mixture of succinic, glutaric and adipic methyl esters), and dioctyl phthalate.

21. The process of claim 14 wherein said ethers comprise ethylene glycol mono methyl ether.

22. The process of claim 14 wherein said amides comprise dimethylformamide.

23. The process of claim 14 wherein said acids comprise as propionic acid.

24. The process of claim 14 wherein said aldehydes comprise isobutyraldehyde.

25. The process of claim 1 wherein said liquid medium is selected from the group consisting of CFC-113 and CFC-11 and said blowing agent is selected from the group consisting of CFC-11, CFC-113 and mixtures thereof.

26. The process of claim 1 wherein said blowing agent is selected from the group consisting of the group comprising HCFC 123, HCFC 141$b$, CFC 11 and mixtures thereof and wherein said liquid medium is selected from the group consisting of CFC11, HCFC 123, HCFC 141$b$, methylene chloride, DBE, dioctyl phthalate and water.

27. The process of claim 1 wherein said blowing agent comprises CFC 113 and wherein said liquid medium is selected from the group consisting of CFC 113, CFC 11, HCFC 123, HCFC 141$b$, DBE, dioctyl phthalate and water.

28. The process of claim 1 wherein said blowing agent is selected from the group consisting of the group comprising butane, pentane and hexane and mixtures thereof and said liquid medium is selected from the group consisting of CFC 11, CFC 113, HCFC 123, HCFC 141$b$, dioctyl phthalate and DBE.

29. The process of claim 1 wherein said blowing agent comprises CFC 114 and wherein said liquid medium is selected from the group consisting of CFC 113, HCFC 123, HCFC 141$b$, methylene chloride, DBE and dioctyl phthalate.

30. The process of claim 1 wherein the foam is broken up by either cutting, crushing or pulverising the foam.

31. The process of claim 1 wherein the step of separating the foam from mixture is done by a step selected from the group consisting of filtration, centrifuging, decanting or combinations thereof.

32. The process of claim 9 further comprising the step of separating blowing agent from the air or gas using a membrane.

* * * * *